Aug. 17, 1954  D. A. SHOEMAKER  2,686,685
FLEXIBLE SEALED COUPLING FOR TUBULAR ELEMENTS
Filed July 3, 1950
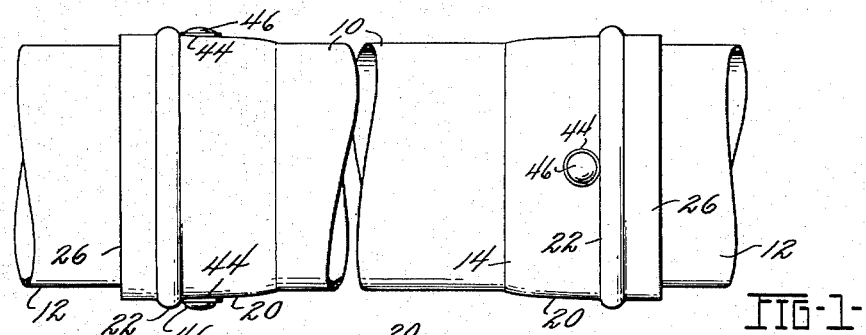
FIG-1-
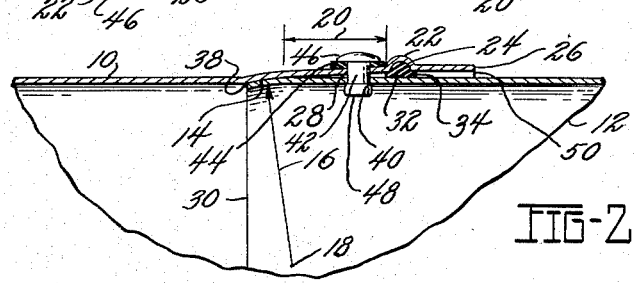
FIG-2-
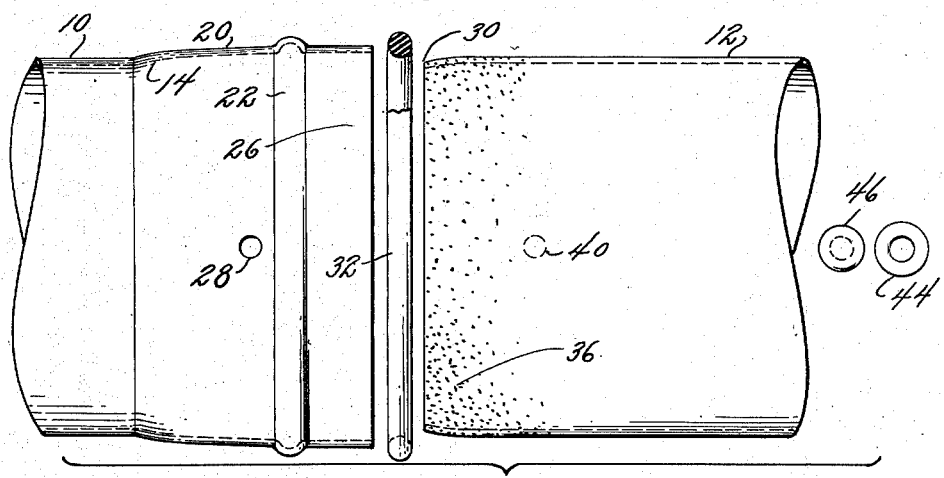
FIG-3-
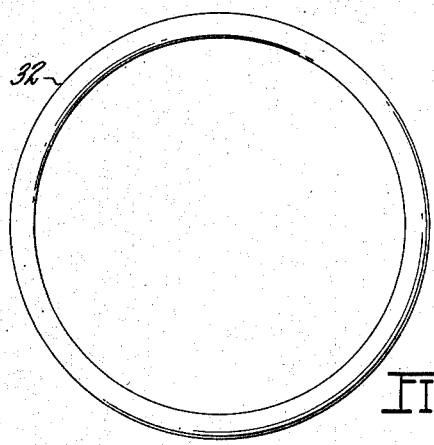
FIG-4-
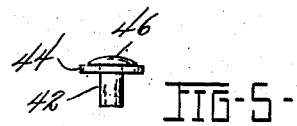
FIG-5-
INVENTOR:
DAVID A. SHOEMAKER.
BY
ATTY.

Patented Aug. 17, 1954

2,686,685

UNITED STATES PATENT OFFICE 2,686,685

FLEXIBLE SEALED COUPLING FOR TUBULAR ELEMENTS

David A. Shoemaker, Toledo, Ohio

Application July 3, 1950, Serial No. 171,841

7 Claims. (Cl. 285—163)

This invention relates to couplings for tubular conductors.

An object of this invention is to provide factory installed terminal parts on individual tube elements, which parts are readily connectible in the field in fabricating pipe lines.

Another object of this invention is to provide a flexible mount of the parts on the tubes which, in turn, will establish a permissible flexing range throughout the pipe line without causing leak producing conditions in the tube couplings.

Another object of this invention is to provide a coupling for a tubular element which is linearly fixed thereto but allows a degree of axial flexing.

Another object of this invention is to provide a tubular element terminal protector which allows the use of a relatively soft metal for the tube body and provides a more rigid terminal encasing part, which part in turn, forms an element of a coupling device. This permits a more rugged handling of the tubular elements during transportation and installation without deforming the termini thereof.

Another object of this invention is to provide sealed couplings for tubular elements of a pipe line which will withstand high internal pressures yet permit a substantial degree of flexing at the joints.

Another object of this invention is to provide a portable pipe line which may use negative pressure or suction therethrough for pipe line transportation of materials.

And another object of this invention is to provide a method of installing pressure-tight couplings of one type of metal on relatively long sections of pipe of a like or different metal whereby a metal to metal seal is established, reinforced and, if desired, locked thereon.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 1 is a side elevation (parts being broken away) of a pair of connected tubular elements joined by a coupling embodying a form of the flexible seal mounting of the invention herein;

Fig. 2 is a linear section through a tube-coupling-part connection of Fig. 1;

Fig. 3 is a distributed view of the elements employed in the fabrication of the tube-coupling-part connection illustrated in Fig. 2;

Fig. 4 is a side elevation of the packing ring element; and

Fig. 5 is a side elevation of a type of explosive rivet used in fixing the linear connection between the conduit and coupling-part.

This invention is more particularly adapted to couplings for large metallic conduits commonly used for quantity transportation of liquids such as water in irrigation projects.

A pair of coupling parts 10 extend in opposite directions from a union (not shown) to provide a substantially rigid coupling member for tubular conduit elements 12. In practice, for purposes of economy, weight, handling, etc., the pipes or tubes 12 may be of a light weight metal such as aluminum, alloys and the like. By the use of a light weight comparatively soft metal, other problems are present, a major example being the protection of the tube termini against deformation and similar hazards to which such units are subjected even in normal handling.

To meet this and other problems, the coupling fractions 10 are factory installed and are of steel, cast iron or the like hard metals. The conduit units 12 are delivered to the field with a member 10 completely installed on each end and it is then a comparatively easy operation to connect two abutting parts 10 by one of several well-known types of rigid marriage, to fabricate pipe lines extending along predetermined paths.

A problem solved by the invention herein is the flexible, yet sealed and fixed linear connection wherein the seal is complete even against high pressures and between the soft metal conduit and the hard metal coupling parts.

To this end, the tubular sleeve 10 is swaged to provide an internal peripheral bell or orbital zone seat 14 having a spherical radius 16, preferably having its center coincide with the axis of the member 10. This radius, with its center is determined by the diameter of the conduit, the materials employed and if possible, by the character of the work to be performed.

From this seat 14, the member 10 has an outwardly extending flare extent 20, in practice being in the magnitude of 1° (shown somewhat exaggerated for illustrative purposes). Adjacent the outer terminus of this flare region, the member 10 is provided with a peripheral bead or ridge which provides an interior peripheral seat 24. From this ridge or rib 22, the member 10 is provided with a terminal cuff 26.

The member 10 is also provided with one or more apertures 28 disposed between the seats 14 and 24. In the smaller tubes a pair of openings 28 diametrically disposed suffices, while tubes of say 4" or more may use three or more of such openings.

The conduit lengths 12 are swaged to form inwardly cupped termini 30 having the radius of the outer face of this dished-in region correspond to the radius 16, so that in assembly, the nesting of a terminus 30 into a seat 14 provides a ball and socket arrangement.

The method of assembly provides for the placing of a resilient ring 32 into seat 24. This ring 32 is circular in cross-section, of rubber or rubber-like material, molded into a unit, and has an interior diameter approximately the same as the outer diameter of the tube 12. Furthermore, the seat 24 and ring 32 are so dimensioned that in assembly, the ring is crowded with approximately two-thirds of the ring volume nested within the seat 24 with the remainder serving to provide the more active flexed gasket portion 34 engaging the exterior of the tube 12.

Following seating of the gasket within member 10, the tube 12 is forced longitudinally therethrough to the seat 14. The outer face adjacent the terminus of the tube is preferably given a coating of some suitable detergent 36 which provides a sufficient lubricant quality to easily pass the tube through the ring 32, simultaneously deforming the same to sealing position and the detergent also provides a slight abrasive action so that the tube 12 when seated, may be rotated to grind in a metal to metal seal 38 between the tube and coupling.

A double sealed connection is now provided and in some instances of use will serve as complete, as for example when suction is used within the pipe line. The seal portion 34 is sufficient to allow a limited flexing of the tube 12 as to the coupling, which is ample in ordinary pipe line construction.

It is usually desirable to anchor the tube 12 in linear fixed relation to the member 10. This is particularly true if any material pressure is used within the line.

To accomplish this, once the seal 38 is established, an aperture 40 is made through the tube 12, in registry with each aperture 28, using the openings 28 as a templet therefor.

An explosive rivet having its shank 42 charged, is inserted through a pair of openings 28, 40, after a resilient washer 44 is placed thereabout against the underside of head 46. This washer is preferably of a material like or similar to the materials in the ring 32. The washer engages the outer face of the coupler part 10 and the rivet is fired or detonated. This forms a terminal enlargement 48 on the shank of the rivet within the conduit and the rivet charge is predetermined to be of sufficient force to lock the rivet in position, yet only compressing the washer 44 enough to effect a seal while leaving a certain amount of resiliency available between the parts.

This assembly leaves a clearance 50 between the cuff 26 and element 12 which actually needs to be but a few thousands of an inch in irrigation projects and the like, but this slight clearance is necessary and vital to effective installations. Within this clearance, the connection is flexible with the gasket portion 34 deformable into an effective seal throughout the limits of deflection.

This mechanical double seal and lock is effective to provide a satisfactory leak-proof joint throughout a wide temperature and pressure range such as encountered in outdoor pipe lines which are subject to sub-zero temperatures as well as comparatively high degrees of heat.

The joints between the coupler parts and conduit unit are so compact that no interior obstructions are formed which would be sufficient to cause any undue disturbances in material flow throughout, whether such material be liquid, plastic or granular.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

In use, it has been found, the parts may be delivered to the field in bulk and the complete assembly accomplished without the use of special equipment. This is particularly important in the maintenance of pipe lines. Furthermore, the members 32 are of various cross-sectional shapes to meet varying circumstances and can even be tubular and the cross-sectional shapes and designs of the rib 22 also predetermined to better meet the needs of the completed line.

What is claimed and is desired to be secured by United States Letters Patent:

1. Coupling construction of the class described including a coupler part having a tubular extent, a terminal enlargement therefrom including a spherical zone-shaped seat having a predetermined radius, an outwardly extending peripheral rib about the enlargement between said zone-shaped seat and the outer terminus of the coupler part, said rib providing a gasket seat peripherally about the interior of said enlargement, a tubular element assembled within said coupler part, said element having its terminus inwardly dished on substantially the same radius as defining the zone-shaped seat and having said terminus nesting in said seat to provide a seal therebetween, and a compressible and flexible ring nested in said gasket seat, embracing said tubular element and deformed into a seal therebetween by the assembled position of said parts.

2. The construction set forth in claim 1 wherein said enlargement has a gradual increase in diameter between said zone-shaped seat and said rib.

3. The construction set forth in claim 1 wherein said enlargement has a gradual increase in diameter between said zone-shaped seat and said rib in the order of 1°.

4. The construction set forth in claim 1 wherein a rivet is set through said enlargement and tubular element adjacent said rib.

5. The construction set forth in claim 1 wherein a rivet is set through said enlargement and tubular element between said zone-shaped seat and said rib.

6. The construction set forth in claim 1 wherein a rivet is set through said enlargement and tubular element adjacent said rib with a washer about said rivet between said enlargement and the head of said rivet, said washer being partially compressed therebetween.

7. Coupling construction for a pair of telescopically connected tubular elements embodying an enlarged terminal portion on the first element, a peripheral zone-shaped seat of a predetermined radius connecting said enlarged terminal portion to the body of said first element, said enlargement having a gradually increased diameter portion extending outwardly from said zone-shaped seat in the order of 1°, an outwardly extending peripheral rib about said enlargement intermediate the extent of said enlargement between the gradually increased diameter portion and the terminus of said element, said rib providing a gasket seat peripherally about the interior of said element, a reduced diameter cup-shaped terminus for said second element, said terminus being cup-shaped along a radius substantially the same as the radius of said zone-shaped seat, said cup-shaped terminus nested in said zone-shaped seat in a direct contact ball-and-socket type sealed relation, a ring-shaped gasket of circular cross-section seated in said gasket seat, said ring and gasket seat so dimensioned that approximately two-thirds of the volume of said ring will be embraced by said seat and the remainder between said first element and the second element embraced thereby, aligned apertures through said elements between said zone-shaped seat and said rib, an exploded rivet set within said apertures, said rivet having a head, and a partially compressed washer between said rivet head and said first element.

References Cited in the file of this patent

UNITED STATES PATENTS

| Number | Name | Date |
|---|---|---|
| 2,080,220 | Butter et al. | May 11, 1937 |
| 2,319,939 | Markey | May 25, 1943 |
| 2,326,455 | Gray | Aug. 10, 1943 |
| 2,457,908 | Meyerhoefer | Jan. 4, 1949 |
| 2,465,708 | Chapin | Mar. 29, 1949 |

FOREIGN PATENTS

| Number | Country | Date |
|---|---|---|
| 319,991 | Great Britain | Oct. 3, 1929 |